Aug. 4, 1970     J. E. WALLACE     3,522,873
FEEDING APPARATUS FOR A PRODUCE MATERIAL
Filed Oct. 11, 1968     2 Sheets-Sheet 1
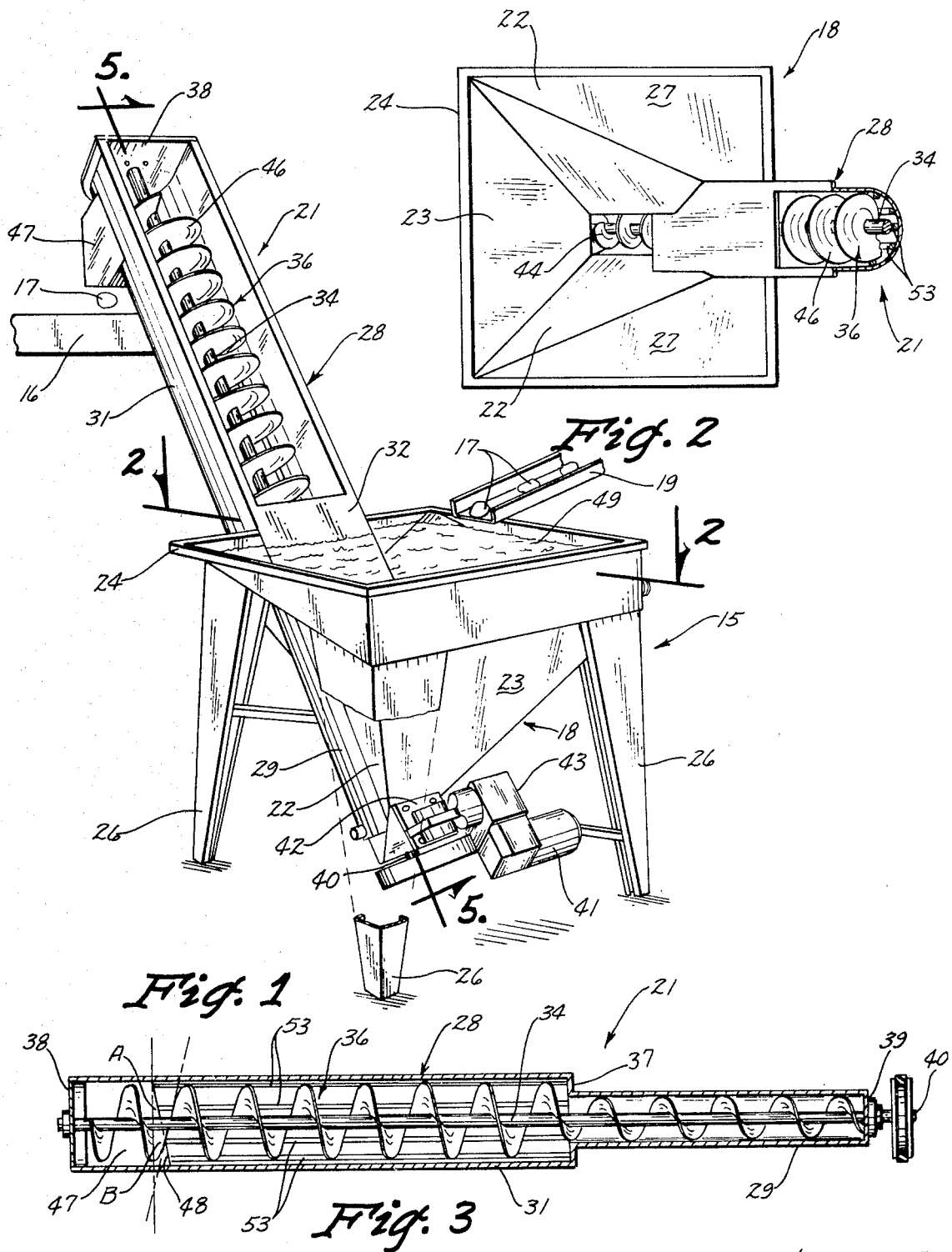
INVENTOR
JOSEPH E. WALLACE
BY
*Rudolph L. Lowell*
ATTORNEY

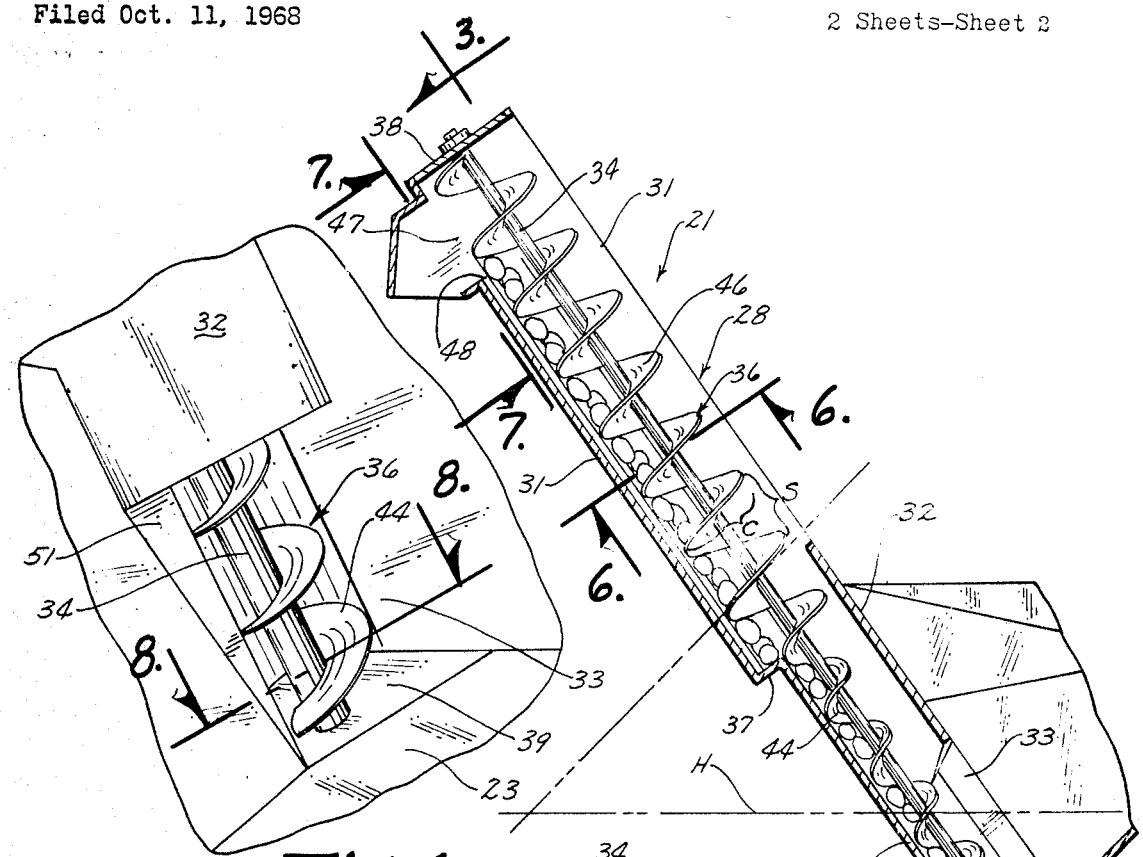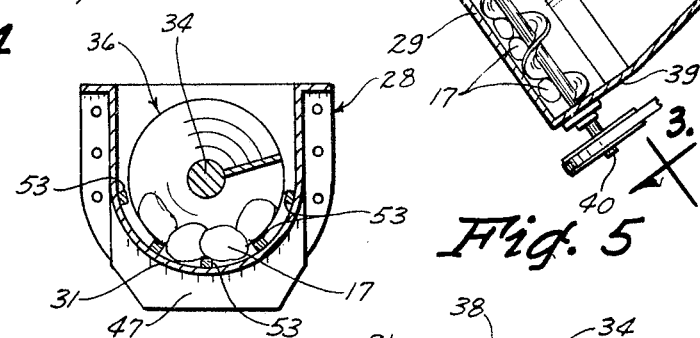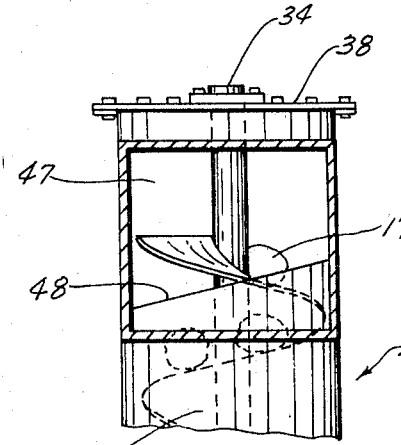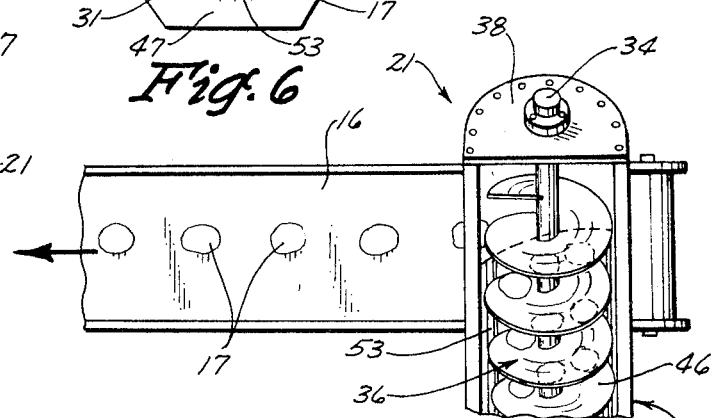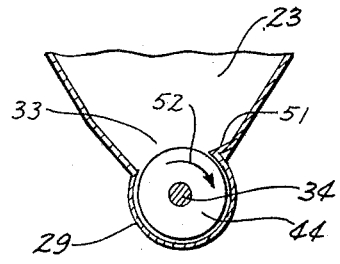

United States Patent Office 3,522,873
Patented Aug. 4, 1970

3,522,873
FEEDING APPARATUS FOR A
PRODUCE MATERIAL
Joseph E. Wallace, Creston, Iowa, assignor to Vanmark
Corporation, Creston, Iowa, a corporation of Iowa
Filed Oct. 11, 1968, Ser. No. 766,882
Int. Cl. B65g 47/16, 47/26
U.S. Cl. 198—30                                      6 Claims

ABSTRACT OF THE DISCLOSURE

The invention provides a produce feeding apparatus that includes a water filled tank having downwardly and inwardly inclined side walls. Located at one end of the tank and inclined upwardly and outwardly from the bottom of the tank is an auger housing comprised of upper and lower housing sections, with the lower housing section having a diameter equal to about one-half the diameter of the upper housing section. An auger unit rotatably supported in the housing has upper and lower auger sections of equal pitch and having flight members corresponding in diameters to the diameters of the housing sections. Produce supplied to the tank enters an inlet portion in the lower housing section that is located below the water level in the tank and of a size to provide for a full loading of the lower auger section. On transfer of the produce from the lower auger section to the upper auger section, the upper auger section is only about half loaded so that the produce is distributed over the lower half portion of the upper auger housing section. A bottom discharge opening at the top of the upper housing section has a transversely extended lower side that is reversely inclined relative to the inclination of the bottom portion of the flight member in the upper housing section. The produce is thus progressively discharged from the upper housing section along such lower side of the discharge opening for successive dropping in a spaced relation onto a horizontally movable conveyor located below the discharge opening.

FOREWORD

In handling of the whole produce material in preparation for slicing, cooking and like operations it is desirable that the produce for such operations be fed in quantities to be efficiently and properly acted upon during such operations. In the handling of potatoes, for example, that are used in the making of potato chips, the potatoes are continuously supplied to slicing machines and then into cooking vats from which the cooked chips are continuously removed for packaging. The cooking oil in the vats must be maintained at a substantially constant temperature to provide for a uniform frying of the chips during the predetermined cooking time period. When the potatoes are permitted to bunch up or to be fed in batches into the slicer machines and then into the oil vats, the oils in the vats are subject to a sudden cooling by the excessive feeding thereto of the sliced potatoes. With the cooking time in the vats being predetermined and due to the resultant time lag in bringing the oil up to the predetermined cooking temperature, the resultant potato chips tend to be undercooked or of non-uniform quality.

SUMMARY OF THE INVENTION

The invention provides an apparatus for continuously feeding a produce material to machines for handling the produce for slicing, cooking and like operations, that operates efficiently to accurately maintain a constant and uniform feed of the produce. The rate of feed is readily controlled in accordance with the demand and capacities of the machines to which the produce is fed without affecting the uniform feeding of the material to the machines. The produce is gently handled at all times by the feeding apparatus so that damage to the product is substantially eliminated. Additionally, the apparatus is compact, and includes a minimum number of movable parts so as to reduce service and maintenance requirements to a minimum.

DETAILED DESCRIPTION OF THE INVENTION

With reference to the drawings:

FIG. 1 is a front perspective view of the produce feeding apparatus of this invention shown in operative relation with a horizontal feed conveyor with part of the apparatus broken away to more clearly show its construction;

FIG. 2 is a sectional view of the apparatus taken along the line 2—2 in FIG. 1;

FIG. 3 is a longitudinal sectional view of an auger assembly that forms part of the apparatus taken along a line normal to the line 5—5 in FIG. 1;

FIG. 4 is an enlarged detail perspective view showing the assembly relation of the lower portion of the auger assembly with the produce receiving tank;

FIG. 5 is a longitudinal sectional view of the auger assembly taken along the line 5—5 in FIG. 1;

FIGS. 6 and 7 are sectional detail views taken along the lines 6—6 and 7—7, respectively, in FIG. 5;

FIG. 8 is a detail sectional view as seen along the line 8—8 in FIG. 4; and

FIG. 9 is a plan view of the upper or discharge portion of the auger assembly showing its relation with a horizontal feed conveyor.

Referring to FIG. 1 of the drawing the produce feeding apparatus, indicated generally as 15, is shown in assembly relation with a horizontal conveyor 16 which receives the produce from the apparatus 15 for conveying to a produce handling machine (not shown). The produce, such as potatoes designated at 17, is supplied to a water filled tank 18 from a supply or delivery chute 19. From the tank 18 the potatoes are directed into the lower end of an upright combination lifting and distributing auger assembly 21 which receives the potatoes from within the tank 18 and carries them upwardly for successive discharge onto the horizontal conveyor 16.

The tank 18 (FIGS. 1 and 2) is of a generally inverted pyramid shape formed with downwardly and inwardly inclined side walls 22 and 23, the upper ends of which are secured to a horizontal supporting frame 24 of a substantially square shape in plan view that is carried at its corners on supporting legs 26. The side walls 22 are located opposite each other and are formed with inwardly sloped stop sections 27. The adjacent ends of the side walls 22 are secured to a housing 28 that forms part of the auger assembly 21. The housing 28 is at one end of the tank 18 and is inclined upwardly and outwardly from the tank bottom so as to close the tank between the adjacent ends of the side walls 22. As best appears in FIG. 2, the side walls 22 and 23 are inclined and relatively arranged so as to direct the potatoes 17 supplied to the tank 18 to the lower end of the auger housing 28.

The auger housing 28 is of a generally trough shape in transverse cross section (FIGS. 1 and 6) and includes a lower housing section 29 and an upper housing section 31. As best appears in FIG. 6 the bottom half portions of the housing sections 29 and 31 are of a semi-circular shape in transverse section having walls extended tangentially upwardly from the sides thereof. The lower housing section 29 has a partial top cover 32 (FIGS. 1 and 4) so as to form within the tank 18 an inlet portion 33 for the housing 28.

The bottom portion of the lower housing section 29 is formed with a diameter equal to about one-half the diameter of the bottom portion of the upper housing section 31 for a purpose to appear later. The housing sections 29 and 31 are arranged end to end with their semicircular bottom portions arranged in a concentric relation, relative to the auger shaft 34 of an auger unit 36, with the adjacent ends of the housing sections 29 and 31 being secured together by a U-shape connecting plate 37.

The auger shaft 34 has its upper end rotatably supported in an end plate 38 at the top of the upper housing section 31, and its lower end rotatably supported in a base plate 39 that closes the bottom end of the lower housing section 29 and forms a terminal extension of the tank side wall 22 as shown in FIG. 4. An end portion 40 of the auger shaft 34 extends downwardly from the base plate 39 (FIGS. 1 and 5) for operative association in a driven relation with a motor 41 that is carried on a mounting plate 42 supported on the tank legs 26. A rheostat control unit 43 connected in the circuit of the motor 41 provides for a variable control of the motor speed in its driving of the auger shaft 34.

The shaft 34 (FIGS. 3 and 5) carries a pair of flight members 44 and 46 corresponding to the housing sections 29 and 31, respectively, that are connected together at their adjacent ends so as to be continuous over the length of the auger housing 28. The auger flights 44 and 46 are formed with a like pitch but with a diameter corresponding to the diameter of an associated housing section 29 and 31 so as to be in operative relation with the semicircular bottom portions thereof. The diameter of the auger flight 46 within the upper housing section 31 is thus equal to about twice the diameter of the auger flight 44 for the lower housing section 29.

As shown in FIGS. 4 and 8 the inlet 33 formed in the lower housing section 29 of the auger housing 28 is of a height equal to about twice the pitch of the auger flight 44 and of a width equal to about one-third of the circumference of the auger flight 44. A discharge opening 47 formed in the bottom portion of the upper end of the housing section 31 (FIGS. 3 and 7) has a length equal to about the pitch of the auger flight 46 and is of a width to extend across the bottom portion of the upper housing section 31. The lower side 48 of the discharge opening 47, for a purpose to appear later, is inclined transversely of the housing section 31 at an angle equal to but reversed relative to the pitch angle of the lower half portion of the auger flight 46, with such angles being indicated, respectively, at A and B in FIG. 3.

In the use of the produce feeding apparatus 15 the tank 18 is filled with water to a level indicated at 49 in FIG. 1. The potatoes 17 that are fed to the tank from the chute 19 are buoyantly supported within the tank for gradual dropping to the tank bottom and are directed toward the inlet 33 by the inclined side walls 22 and 23. By virtue of the size of the inlet 33, relative to the auger flight 44, the potatoes are permitted to completely load the auger flight 44 at the inlet 33. The potatoes, in excess of such loaded condition of the auger flight 44, are moved from the flight 44 by their contact engagement with that side 51 of the inlet 33 (FIG. 8) which is in a trailing relation relative to the directional rotation of the auger flight as indicated by the arrow 52.

As a result of the relative difference in the diameters of the auger flights 44 and 46, and with the pitch of such flights being the same, the potatoes 17 on transfer from the lower housing section 29 upwardly into the upper housing section 31 are distributed along only the bottom portion of the auger flight 46 as illustrated in FIGS. 5 and 6. Stated otherwise, the auger flight 46 is only about half loaded relative to the full loaded condition of the auger flight 44.

To retain the potatoes 17 along the lower portion of the flight 46 there are provided elongated rod members 53 (FIGS. 3 and 6) extended longitudinally of the bottom half portion of the auger housing section 31 in a circumferentially spaced relation. The retaining rods 53 retard or obstruct the tendency of the potatoes 17 to be moved by the flight member 46 upwardly out of the bottom half portion of the housing 31 so as to function as guides for retaining the travel of the potatoes 17 in a direction longitudinally of the housing section 31.

With the potatoes 17 distributed along the lower portion of the auger flight 46 they are moved upwardly of the housing section 31 to the discharge opening 47. As a result of the reversely inclined relation of the opening lower side 48 relative to the pitch angle B of the lower portion of the auger flight 46 the potatoes 17 distributed over the bottom half portion of the housing section 31 are successively moved into the opening 47 for dropping one after the other onto the horizontal conveyor 16. On horizontal movement of the conveyor 16, and as best shown in FIG. 9, the potatoes 17 are substantially uniformly spaced longitudinally of the conveyor. By varying the speed of rotation of the auger shaft 34 the rate of discharge may be increased or decreased without interfering with spaced relation of the potatoes 17 on the conveyor 16.

To complement the function of the rods 53 for maintaining the distribution of the potatoes 17 over the bottom half portion of the housing section 31 it is desirable that the upward inclination of the auger housing 28 from the water tank 18 be such that the plane of the side portion of the auger flight 46, indicated at C in FIG. 5, and extending over substantially one-half of the pitch length of a flight section 5 forms an angle of not less than about forty-five degrees with a horizontal plane H. By virtue of this angular inclination of the housing 28 the tendency of the potatoes 17 to be moved out of the bottom portion of the housing section 31 by the rotating action of the auger flight 46 is substantially eliminated.

In one embodiment of the invention the auger flight 44 has a diameter of six inches, and the auger flight 46 a diameter of sixteen inches, for a pitch of both flight members 44 and 46 of six inches. The relative diameters of the auger flights 44 and 46 may be varied, to vary the distribution of the potatoes 17 over the bottom half portion of the auger flight 46. However, the pitch of the flight members 44 and 46 providing for such distribution should be the same for both flight members and maintained within limits relative to the upward inclination of the auger housing 28 from the tank 18 to provide for the potatoes being retained over the bottom half portion of the housing section 31 during their upward movement to the discharge opening 47.

I claim:

1. An apparatus for feeding produce material singly onto a linearly movable horizontal conveyor comprising:
   (a) a fluid containing tank for receiving produce material having downwardly and inwardly inclined side walls,
   (b) an auger housing on said tank inclined upwardly and outwardly from the bottom thereof,
   (c) said auger housing having a first lower section and a second upper section of a substantially greater diameter than the diameter of said first housing section, said second housing section having a discharge opening adjacent the top of the bottom side thereof and said first housing section having an inlet portion open to the tank, and
   (d) an auger unit rotatably mounted in said housing including a lower auger section and an upper auger section corresponding to said first and second housing sections, respectively, said auger sections each having a flight member of equal pitch, and each flight member having a diameter corresponding in size to the diameter of a corresponding housing section,
   (e) said discharge opening having the lower side wall thereof positioned below the top end of said upper auger section and extended transversely of the housing section at an angle substantially equal to but reversely inclined relative to the pitch angle of the lower portion of said flight members, whereby the produce material moved by said upper auger section is discharged singly through said discharge opening for dropping onto the horizontal conveyor.

2. The produce feeding apparatus according to claim 1 wherein:
   (a) the diameter of the flight members of the upper auger section is at least equal to twice the diameter of the flight member of the lower auger section.

3. The produce feeding apparatus according to claim 1 wherein:
   (a) said inlet portion is located below the level of the fluid in said tank and is of a height equal to about twice the pitch of said flight members and of a width equal to about one third of the circumference of said lower auger section to provide for a substantially full loading of the flight member in said first housing section by the produce material, whereby on transfer of the produce material from said first housing section to said second housing section the produce material is distributed across the bottom half portion of the flight member in said second housing section.

4. The produce feeding apparatus according to claim 3 including:
   (a) elongated members extended longitudinally of the second housing section in a circumferentially spaced relation about the bottom half portion thereof for retaining the produce material against travel upwardly out of said bottom half portion.

5. The produce feeding apparatus according to claim 3 wherein:
   (a) the produce material is buoyantly supported by the fluid in said tank for travel into said inlet portion over the full height thereof, with the produce in excess of a full loaded condition of the flight member in said first housing section being excluded from entering said inlet portion by contact engagement with the upright side face of said inlet portion that is in a trailing direction relative to the direction of rotation of said auger unit.

6. The produce feeding apparatus according to claim 3 wherein:
   (a) said auger unit includes a single shaft having a lower end thereof rotatably supported on the bottom of said tank and a top end rotatably supported at the upper end of said second housing section, and
   (b) said flight members are continuous axially of said shaft.

References Cited

FOREIGN PATENTS 491,365  8/1938  Great Britain.

EDWARD A. SROKA, Primary Examiner

U.S. Cl. X.R.

198—64